United States Patent [19]
Kirschner et al.

[11] Patent Number: 4,660,741
[45] Date of Patent: Apr. 28, 1987

[54] WATER PURIFICATION SYSTEM AND METHOD FOR A POST-MIX BEVERAGE DISPENSER

[75] Inventors: Jonathan Kirschner, Marietta; Kathryn M. Chase, Atlanta, both of Ga.

[73] Assignee: The Coca-Cola Company, Atlanta, Ga.

[21] Appl. No.: 737,413

[22] Filed: May 24, 1985

[51] Int. Cl.⁴ .......................... B67D 1/08; B67D 5/58
[52] U.S. Cl. ..................................... 222/1; 222/129.1; 222/146.6; 222/189; 222/190; 210/416.1; 261/5; 366/316
[58] Field of Search ................. 222/129.1, 146.6, 189, 222/190, 1; 62/308, 392; 210/416.1, 482, 416.3; 261/3, 5, DIG. 7; 366/316

[56] References Cited

U.S. PATENT DOCUMENTS

| 1,089,806 | 3/1914 | Wood | 366/316 |
| 1,806,977 | 5/1931 | Kenney | 210/482 X |
| 2,655,011 | 10/1953 | Ihle et al. | 62/392 |
| 2,984,462 | 5/1961 | O'Connor | 366/316 |
| 3,206,033 | 9/1965 | Kern | 210/482 |
| 3,853,244 | 12/1974 | Neumann | 222/129.1 |
| 4,051,034 | 9/1977 | Amon et al. | 261/DIG. 7 X |
| 4,181,243 | 1/1980 | Frahm | 222/189 |
| 4,493,441 | 1/1985 | Sedam et al. | 222/146.6 X |

FOREIGN PATENT DOCUMENTS 74243 7/1970 German Democratic Rep. ............................ 366/316

Primary Examiner—Joseph J. Rolla
Assistant Examiner—Frederick R. Handren
Attorney, Agent, or Firm—Birch, Stewart, Kolasch & Birch

[57] ABSTRACT

A post-mix beverage dispenser and refrigeration system therefor including a water filter/purifier disposed within a refrigerated water reservoir for filtering carbonated water output from the dispenser carbonator en route to being mixed with flavor concentrate. The water reservoir also has a rotary agitator blade immersed therein with apertures to increase agitation.

5 Claims, 4 Drawing Figures

WATER PURIFICATION SYSTEM AND METHOD FOR A POST-MIX BEVERAGE DISPENSER

BACKGROUND OF THE INVENTION

The present invention relates to post-mix beverage dispensers which are compact, portable and suitable for use in small offices or small volume locations. More specifically, the present invention relates to a compact post-mix beverage dispenser unit which may be disposed on a counter top in the above-mentioned environments and supplied with water from a pitcher, syrup from disposable sealed packages and $CO_2$ for carbonation from refillable containers in a rapid and efficient manner. An accessory attachment may allow connection to a building water supply for automatic refill of the reservoir.

Heretofore, the majority of commercially-available post-mix beverage dispenser units have been designed for large volume commercial uses such as in fast food restaurants. Because of these large volume uses, design criteria have emphasized optimum cooling and dispenser speed rather than low unit cost, size and portability. Although some consideration has been given to cost, size and portability even in these large volume commercial units, the resulting unit designs are generally far too expensive, bulky and heavy for small volume use.

Some attempts have been made in the beverage dispenser industry to reduce the cost, size and weight of these units to make them available for use by the general public. However, the units designed heretofore have lacked sufficient cooling capacity, dispensing efficiency, beverage quality and reliability as a trade off to achieving the aforementioned low cost, size and portability needed for consumer acceptance.

SUMMARY OF THE INVENTION

Accordingly, it is a primary object of the present invention to provide a portable, low cost, miniature post-mix beverage dispenser unit suitable for use in small offices or low volume locations.

It is another object of the present invention to provide a heat transfer circuit in a post-mix beverage unit operatively associated with a mechanical refrigeration system which directly contacts and cools the water, carbonator tank and syrup packages contained in the unit.

It is a further object of the present invention to provide a system and method for purifying water in a beverage dispenser by placing a water filter at an optimum location therein to provide high cooling efficiency of the refrigeration system and extended filter life.

It is still a further object of the present invention to provide an improved agitator disc configuration for further increasing the cooling efficiency of the refrigeration system.

The objects of the present invention are fulfilled by providing a post-mix beverage dispenser including a supply of flavor concentrate, a carbonator for making carbonated water, a water reservoir for supplying water to said carbonator tank, means for refrigerating water in said water reservoir and means for mixing said flavor concentrate with carbonated water output from said carbonator, the improvement comprising:

(a) a water filter immersed in the water of said water reservoir; and (b) conduit means for passing the carbonated water output from the carbonator through said water filter before mixing with flavor concentrate.

Cooling efficiency is enhanced by the above-described water filter location as well as by an agitator assembly including a rotary agitator disc within the water of said water reservoir, said disc having apertures therein permitting the flow of said water therethrough, to thereby increase the amount of water agitation achieved compared to a similar-shaped disc without said apertures.

As an alternative, an accessory attachment may allow connection to a building water supply for automatic refill of the reservoir.

BRIEF DESCRIPTION OF THE DRAWINGS

The objects of the present invention and the attendant advantages thereof become more readily apparent by reference to the accompanying drawings, wherein.

DETAILED DESCRIPTION OF THE PREFERRED EMBODIMENTS

Figure 1:
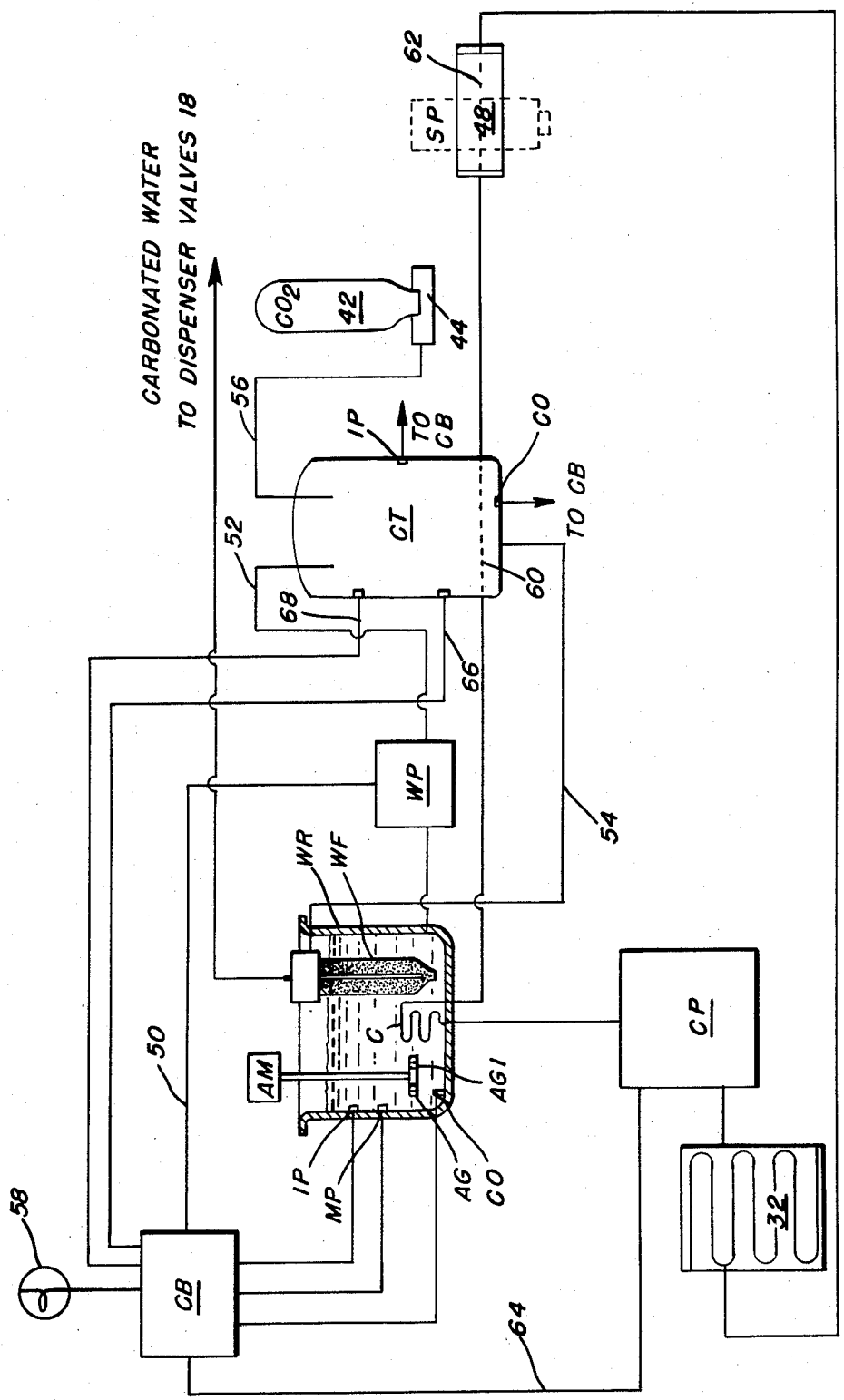
FIG. 1 is a schematic diagram of the mechanical refrigeration system of the present invention.

The post-mix beverage dispenser to which the improvements of the present have been applied is fully disclosed in U.S. Pat. No. 4,493,441 to Sedam et al., issued Jan. 15, 1985. A schematic diagram of the refrigeration system of that patent is illustrated in FIG. 11 thereof and is similar to portions of the system of FIG. 1 to be discussed hereinafter, like reference numerals referring to like parts.

The water supply, carbonation and refrigeration systems of the present invention are illustrated in the schematic diagram of FIG. 1. The water reservoir WR is connected to the carbonator tank CT through the water pump WP to pump water on demand from the reservoir to the carbonator tank under the supervision of a plurality of probes IP, MP and CO and suitable electrical controls within box CB. That is, when power is turned on, pump WP will normally pump water from reservoir WR into carbonator tank CT. However, if the water level falls below the minimum level of probe MP, the electrical circuitry provided within control box CB will turn pump WP off and indicator light 58 on, which signals the need to refill the water reservoir WR.

Probes IP in water reservoir tank WR and carbonator tank CT sense the build-up of ice on the walls thereof, and when it exceeds a predetermined thickness whereby it covers probes IP, compressor CP is turned off via control box CB and control line 64. Probes CO in water reservoir tank WR and carbonator tank CT are merely the common or ground connections for the circuitry of both probes IP and MP.

Carbonator tank CT also has an additional pair of probes 66 and 68 to initiate or terminate the operation of water pump WP, depending on the level of water present in carbonator tank CT. That is, when the water level drops below probe 66, pump WP turns on to fill the carbonator tank, and when it reaches a maximum level at the position of probe 68, a signal is generated in the control circuitry within box CB via line 50 to turn the water pump WP off. Thus, the respective probes in the water reservoir WR and carbonator tank CT are all connected through the electrical control circuitry in control box CB to either turn the water pump WP on and off, or the refrigeration compressor CP via line 64.

With water present in carbonator tank CT, it operates in a conventional manner by mixing water from line 52 and $CO_2$ gas from line 56 within the tank CT and dispensing carbonated water through outlet line 54 to the dispenser valve assembly 18 wherein it is mixed with syrup from the syrup packages SP.

As further illustrated, the mechanical refrigeration system includes a compressor CP, an evaporator C, and a condenser 32 connected in a closed refrigeration loop. The evaporator C is disposed in contact with the water reservoir WR to directly chill the water to be pumped to the carbonator. As illustrated, a portion of the evaporator C, namely portion 60, wraps around the carbonator tank CT to cool the same. In addition, another portion 62 of evaporator C may pass directly behind and in direct contact with cooling bracket 48 which surrounds syrup packages SP on three sides to cool the contents of those packages. Thus, the mechanical refrigeration system of the present invention may be in heat transfer relationship with all of the essential components of the post-mix beverage to be dispensed prior to the mixing of those components within mixing nozzles 22. This assures that a post-mix beverage is dispensed at a controllable and suitable temperature into cups or containers resting on drip tray 20.

FIG. 1 is a schematic diagram of the refrigeration system of the dispenser disclosed in the aforementioned U.S. Pat. No. 4,493,441 with the addition of a water filter WF and a modified agitator disc AG.

In order to assure that no undesirable tastes or odors, which might exist within the water of reservoir WR, permeate or effect the final beverage taste, a water filter WF is provided in carbonator water outlet line 54. This filter WF preferably has an activated carbon filtration element which purifies carbonated water passing therethrough by removing undesirable odors and tastes.

It is a discovery of the present invention that an optimum location for the water filter WF is within the water reservoir WR in a recirculation path (outlet line 54) of carbonated water from carbonator tank CT. However, improved cooling can also be obtained if the filter WF is in the water reservoir in series with the still water output line between pump WP and carbonator CT.

The advantages of the optimum location are at least three-fold. Firstly, this location results in increased cooling efficiency of the system carbonated water and thus the final beverage because the filter WF is immersed within the chilled water of reservoir WR. Secondly, the life of filter WF is increased because carbonated water has a lower pH (approximately 4.2) than still water, and this lower pH tends to increase the life of activated carbon filters. Thirdly, the lower pH greatly increases the chlorine removal capacity of an activated carbon filter. In fact, a reduction of one full point of pH gives the appearance of doubling chlorine removal capacity by adsorption. Chlorine removal capacity decreases with a decrease in water temperature. However, the increase in removal capacity achieved by the lower pH of carbonated water more than offsets the decrease caused by the lower temperature of the filter environment.

In contrast to this optimum location of filter WF, prior attempts to place a water filter outside of reservoir WR in series with the still water input line 52 to carbonator tank CT have resulted in inefficient cooling, the filter WF acting as a heat sink or absorber of the ambient temperature, which is then transferred to the water. In addition, the life of the activated carbon filtration element is decreased when it is used to filter still water having a higher pH.

Figure 2:
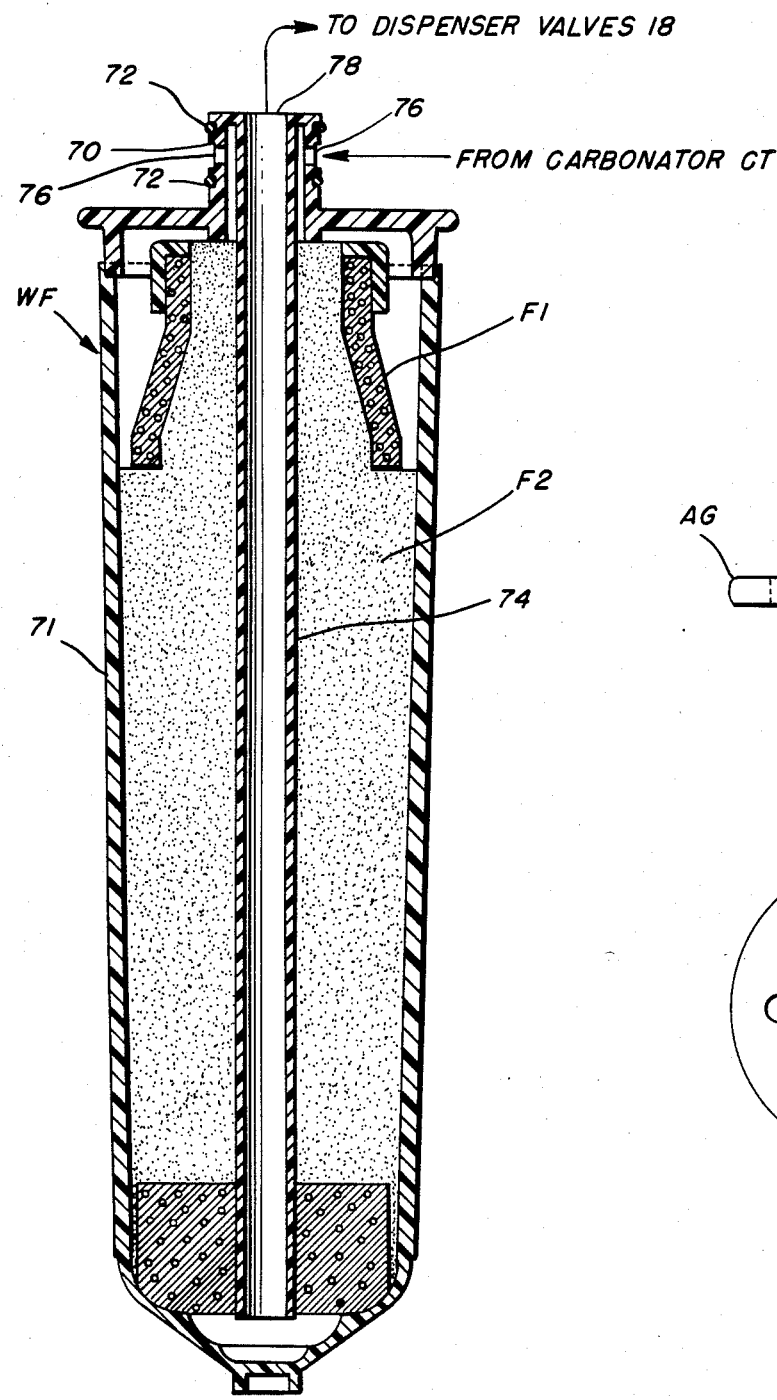
FIG. 2 is a cross-sectional view of a water filter used in the system of FIG. 1.

The details of a preferred filter structure are illustrated in FIG. 2. Filter WF is preferably a conventional activated carbon filter manufactured by the Cuno Filter Division of AMF, Inc. Filter WF has an outer, substantially cylindrical housing 71 which contains an upper filter material F1, conventionally known as "MICROKLEEN" and a lower filter material F2 of activated carbon. A top fitting 70 is provided including inlet orifices 76 for carbonated water from carbonator CT (the preferred embodiment) or still water from the water pump WP. Fitting 70 is designed to fit into a socket of an input/output manifold and support block (not shown). O-ring seals 72 insolate input openings 76 from an output opening 78 in tube 74. It can be seen that water to be filtered passes through input openings 76; down through filter materials F1, F2; and up tube 74 through outlet opening 78 en route to the dispenser valves.

Figure 3A:
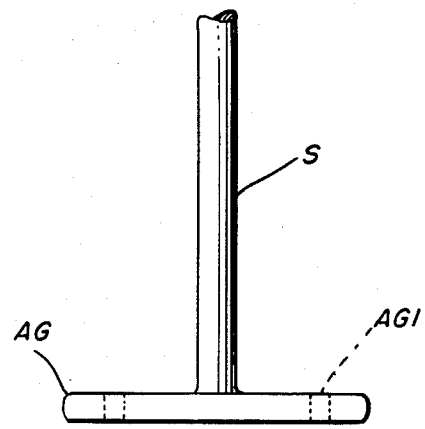
FIGS. 3A and 3B are side elevation and top plan views of an improved agitator assembly for use in the system of FIG. 1.
Figure 3B:
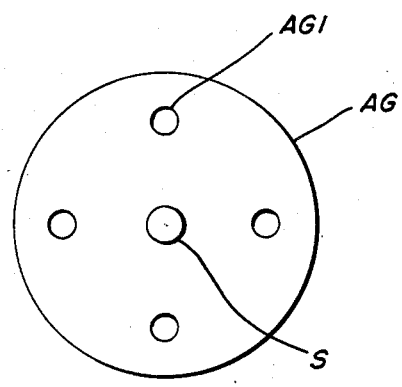

The cooling efficiency of the system of the present invention is further increased by using an agitator assembly in water reservoir WR with a rotary disc AG with a series of apertures AG1 therein. This agitator assembly is schematically illustrated in FIG. 1 as extending into reservoir WR. The assembly includes an electric motor AM suitably supported in the dispenser cabinet, a motor shaft S and the disc AG with holes AG1 therein. The details of the blade AG structure and holes AG1 are illustrated in detail in FIGS. 3A and 3B. The disc AG of the agitator assembly is preferably substantially planar in side elevation and circular in top plan view. This shape minimizes splashing, as compared to an agitator with conventional impeller blades thereon, when the water level in WR approaches the level of disc AG. However, a flat, disc-like shape does not agitate as well as conventional impeller blades. In order to increase the agitation (circulation of water) while minimizing the degree of splashing, the disc AG of the present invention is provided with holes AG1. These holes AG1 increase agitation and turbulence to a significant extent. It has been found that the provision of holes AG1 significantly increases water agitation and hence cooling with essentially no increase in noise level or splashing of water even at low water levels in reservoir WR.

Additional cooling efficiency may be achieved by using thermal mastic between contiguous parts where heat transfer is desired, and insulation of parts exposed to ambient or increased temperatures of other components.

It should be understood that a preferred embodiment of the dispenser cabinetry and system components of the beverage dispenser of the present invention have been described herein, but that modifications may be made as would occur to one of ordinary skill in the art without departing from the spirit and scope of the present invention.

What is claimed is:

1. In a post-mix beverage dispenser including a supply of flavor concentrate, a carbonator for making carbonated water, a water reservoir for supplying water to said carbonator tank, means for refrigerating water in said water reservoir and means for mixing said flavor concentrate with carbonated water output from said carbonator, the improvement comprising:

(a) a water filter immersed in the water of said water reservoir; and (b) conduit means for passing the carbonated water output from the carbonator through said water filter before mixing with flavor concentrate.

2. The dispenser of claim 1, wherein said water filter includes an activated carbon filtration element.

3. The dispenser of claim 1, further including a rotary agitator disc within the water of said water reservoir, said disc having apertures therein permitting the flow of said water therethrough, to thereby increase the amount of water agitation achieved compared to a similar shaped disc without said apertures.

4. A method of purifying water in a post-mix beverage dispenser including a supply of flavor concentrate, a carbonator for making carbonated water, a water reservoir for supplying water to said carbonator tank, means for refrigerating water in said water reservoir and means for mixing said flavor concentrate with carbonated water output from said carbonator, comprising the steps of:

(a) immersing a water filter in the water of said water reservoir; and (b) passing the carbonated water output from said carbonator through said water filter before mixing the carbonated water with flavor concentrate.

5. The method of claim 4, wherein said water filter includes an activated carbon filtration element.

* * * * *